United States Patent
Sugimoto

(10) Patent No.: US 7,493,517 B2
(45) Date of Patent: Feb. 17, 2009

(54) FAULT TOLERANT COMPUTER SYSTEM AND A SYNCHRONIZATION METHOD FOR THE SAME

(75) Inventor: Motohiro Sugimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 425 days.

(21) Appl. No.: 11/304,180

(22) Filed: Dec. 15, 2005

(65) Prior Publication Data

US 2006/0149903 A1  Jul. 6, 2006

(30) Foreign Application Priority Data

Dec. 17, 2004  (JP)  ............... 2004-365345

(51) Int. Cl.
*G06F 11/00* (2006.01)
(52) U.S. Cl. ............................................. 714/11
(58) Field of Classification Search .............. 714/11, 714/12, 13, 15, 18, 31
See application file for complete search history.

(56) References Cited

U.S. PATENT DOCUMENTS

| | | | |
|---|---|---|---|
| 5,841,963 A | | 11/1998 | Nakamikawa et al. |
| 6,038,684 A | * | 3/2000 | Liddell et al. .................. 714/11 |
| 6,233,702 B1 | * | 5/2001 | Horst et al. .................... 714/48 |
| 6,694,449 B2 | * | 2/2004 | Ghameshlu et al. ........... 714/11 |
| 7,003,692 B1 | * | 2/2006 | Banks et al. ................... 714/12 |
| 7,178,058 B2 | * | 2/2007 | Tsukahara .................... 714/12 |
| 2001/0025352 A1 | * | 9/2001 | Ghameshlu et al. ........... 714/11 |

FOREIGN PATENT DOCUMENTS

| | | |
|---|---|---|
| EP | 0 411 805 A2 | 2/1991 |
| JP | 09-128354 | 5/1997 |
| JP | 09-282292 | 10/1997 |
| JP | 2000-222375 | 8/2000 |
| JP | 2001-265750 | 9/2001 |
| JP | 2002-140314 | 5/2002 |
| JP | 2004-046455 | 2/2004 |

* cited by examiner

*Primary Examiner*—Nadeem Iqbal
(74) *Attorney, Agent, or Firm*—Scully, Scott, Murphy & Presser, P.C.

(57) ABSTRACT

Each time a sync controller sequentially issues a read request to a memory controller, a count value of a first counter is incremented. When a read operation is conducted for the read request, a count value of a second counter is incremented and the data is transferred to a standby computer. If a memory write instruction is issued during a memory copy operation, an address comparator compares a write address of the memory write instruction with the count values of the first and second counters. If the write address is more than the count values, the memory write operation is permitted. If the write address is equal to the count value of the first counter, the process waits for termination of the data read operation. Otherwise, the write operation is immediately permitted and the write data is transferred to the sync controller. Data of a memory on the active side can be hence copied onto the standby computer without stopping the system operation.

12 Claims, 8 Drawing Sheets

FAULT TOLERANT COMPUTER SYSTEM AND A SYNCHRONIZATION METHOD FOR THE SAME

BACKGROUND OF THE INVENTION

1. Field of the Invention

The present invention relates to a fault tolerant computer system of lockstep type and a synchronization method for the same in which a plurality of computer systems simultaneously execute the same instruction string at timing synchronized with a clock signal, and in particular, to a fault tolerant computer system of lockstep type and a synchronization method for the same in which operation activated, when the operational synchronism (a lockstep state) between the computer systems is disturbed in a first computer system, to restore the operational synchronism (to rebuild the lockstep state) can be conducted without stopping the ordinary operation of computer systems other than the first computer system separated from the fault tolerant computer system.

2. Description of the Prior Art

According to the lockstep fault tolerant computer system of the related art, in a plurality of computer systems synchronously executing the same instruction string, when it is detected that one of the computer systems conducts an output operation different from that of the other computer systems due to failure or external or internal factors, the computer system in which the fault takes place is once separated from the other computer systems to be set to a non-operating state. The computer system is replaced with another system if necessary depending on the factor of the fault. If the replacement of the computer system is not required, the system is, for example, re-initialized according to necessity and is set again to an operative state.

In the operation to restore the failed computer system into the operative state in the conventional fault tolerant computer system of lockstep type, the contents of the memory of the failed computer thus replaced or the memory of a computer on the standby side in the initial setup phase is required to be set to match those of an associated computer on the active side. Therefore, it is required to copy the entire data of the main memory of the computer system in an operative state onto the main memory of the computer system to be restored to an operative state.

In the lockstep fault tolerant computer system of the related art, after the failed computer system is replaced and re-initialization is conducted according to a section thereof having caused the failure, the computer systems in the operative state are stopped to restore the failed computer system to an operative state (reference is to be made to, for example, Japanese Patent Application Laid-Open No. 2004-046455).

That is, in the conventional lockstep fault tolerant computer system, it is necessary for the whole computer system to stop operation for a long period of time, i.e., three to five seconds or for a period in the order of minutes to recover the failed computer system to an operative state for the following reason.

To reset the failed computer system to an operative system, if the other computers continue to work when the contents of the main memory of the computer system having been in the operative state are copied onto the main memory of the computer system to be recovered as above, there arises a fear of destruction of the contents of the main memory of the computer system in the operative state. In a case in which the computer system on the copy source side continues operation during the copy operation, if data at an address where the copy has been completed is updated, the main memory contents of the computer system in the operative state cannot be appropriately copied onto the computer system to be restored to an operative state.

To remove the difficulty, there has been proposed a technique, for example, in Japanese Patent Application Laid-Open No. 2001-265750. According to the technique, there are prepared registers to keep addresses of areas onto which the copy has been finished. At occurrence of a write instruction, an address of the instruction is checked to determined whether or not the copy has already been completed for an area designated by the address. If the write instruction is requested with an address of an area onto which the copy operation has been finished, the address is stored in the register. After the memory copy has been completely conducted, the address is obtained from the register to read data from the area. The data is then transferred to the computer of the transfer destination.

In the conventional lockstep fault tolerant computer system, when a computer system separated from the fault tolerant computer system due to a fault is restored to an operative state, the other computer systems in operation are also once stopped to conduct the main memory copy. Since the memory of the computer system at present has a memory capacity of several gigabytes, the entire memory copy takes a long period of time. This leads to a problem that the system operation is stopped for a long period of time. To cope with the problem, there has been proposed a technique in which while limiting the memory access in the computer systems in the active side on which the fault tolerant computer system is normally operating, the contents of the main memory are copied from the active side onto the computer system on the standby side to be restored. However, this arises a problem that special processing is required for software and performance is remarkably lowered in the computer systems continuously executing processing.

According to the method described in Japanese Patent Application Laid-Open No. 2001-265750, in a situation in which a memory read operation is about to be executed for the memory copy, if a memory write instruction is issued for an address of the memory read operation, there is possibility that the memory write operation would go ahead. Therefore, it cannot be guaranteed that the contents of the memory of the transfer source are completely sent to the transfer destination memory. In this method, since data is read from the area of the address at which the memory write has been conducted and then is transferred to the destination, there occurs a problem that the transfer of write data takes a long period of time.

SUMMARY OF THE INVENTION

It is therefore a first object of the present invention, which has been devised to solve the above problem, to accomplish the processing to restore the computer system on the standby side without stopping operation of the computer systems on the active side. A second object of the present invention is to remove the requirement of the particular processing for the software. A third object of the present invention is to suppress the deterioration in the performance of the computer systems on the active side during the restoration of the computer on the standby side. A fourth object of the present invention is to complete the data transfer through a possibly small number of processing steps to thereby implement the synchronization of the computer systems in a short period of time.

To achieve the above object in accordance with the present invention, there is provided a fault tolerant computer system including a plurality of computer systems each of which includes one processor or a plurality of processors, a main memory, a routine controller, a synchronization (sync) controller, and a bridge circuit connecting the processors, the main memory, the routine controller, and the sync controller to each other to control the constituent components. The respective computer systems are synchronized and process the same instruction string. When data of a main memory of a first computer system is copied onto a main memory of a second computer system, the data is read via a sync controller from the main memory to be transferred to a sync controller of the second computer system. The routing controller includes a memory access monitor unit including a counter module which determines, when the data is read via the sync controller from the main memory, a state of a process of the read operation and an address comparator to compare, when the processor issues a write instruction, a counter value of the counter module with an address (a write address) for which a writing operation is conducted by the write instruction. When the processor issues a write instruction for the main memory during an operation in which to synchronize a computer system in a non-operating state (a standby computer system) with a computer system in an operating state (an active computer system), data of the main memory of the active computer system is sequentially transferred to the standby computer system; the memory access monitor unit transfers, according to a result of a comparison conducted by the address comparator, to the sync controller of the active computer system only write data of an address for which a data read operation has already been completed and write data of an address for which a data read operation is being currently conducted.

In accordance with the present invention, there is provided a fault tolerant computer system to achieve the object. The system includes a plurality of computer systems each of which includes one processor or a plurality of processors, a main memory, a routine controller, a sync controller, and a bridge circuit connecting the processors, the main memory, the routine controller, and the sync controller to each other to control the constituent components. The respective computer systems are synchronized and process the same instruction string. When data of a main memory of a first computer system is copied onto a main memory of a second computer system, the data is read via a sync controller from the main memory to be transferred to a sync controller of the second computer system. The routing controller includes a memory access monitor unit including a counter module which determines, when the data is read via the sync controller from the main memory, a state of a process of the read operation and an address comparator to compare, when the processor issues a write instruction, a counter value of the counter module with an a write address for which a writing operation is conducted by the write instruction. When the processor issues a write instruction for the main memory during an operation in which to synchronize a standby computer system with an active computer system, data of the main memory of the active computer system is sequentially transferred to the standby computer system; the memory access monitor unit executes, if the write instruction is issued for an address for which a data read operation is completed or for which a data read operation is currently in process according to a result of a comparison conducted by the address comparator, the write instruction and notifies an interrupt, and the sync controller obtains the write data in an operation of executing interrupt processing of the interrupt thus notified.

To achieve the object in accordance with the present invention there is provided a synchronization method of synchronizing a standby computer system with an active computer system for use with a fault tolerant computer system including a plurality of computer systems each of which includes one processor or a plurality of processors, a main memory, a routine controller, a sync controller, and a bridge circuit connecting the processors, the main memory, the routine controller, and the sync controller to each other to control the constituent components. The respective computer systems are synchronized and process the same instruction string. When data of a main memory of an active computer system is copied onto a main memory of a standby computer system, if a write instruction is issued for an address for which a data transfer operation is completed or for an address for which a read operation is started to transfer data to the standby computer system; data of the write instruction is transferred to the standby computer system to thereby synchronize the standby computer system with the active computer system without stopping the active computer system.

In accordance with the present invention, there is obtained a first advantage that the standby-side computer system can be synchronized without stopping operation of the active-side computers, namely, by retaining the ordinary operation state.

A second advantage is that on the active side, the write access of any computer system to the main memory is not limited for the software. Therefore, the memory access is not particularly taken into consideration for the software. In the synchronizing operation, the computer can be used in almost the same way as in the ordinary operation. This makes it possible to retain simplicity of software control.

A third advantage is that since the memory access is not limited for software and firmware, the performance reduction of the computer systems is limited to the memory access for the synchronization processing. Therefore, the synchronization can be completely accomplished in a remarkably shorter period of time as compared with the case in which the memory accesses are inhibited in the computer systems.

A fourth advantage is that even if a write instruction is issued for a main memory during the synchronization processing, duplicated transfers of write data of the write instruction to an associated computer system on the standby side can be reduced to the maximum extent. This consequently suppresses deterioration in the system performance as much as possible.

BRIEF DESCRIPTION OF THE DRAWINGS

The objects and features of the present invention will become more apparent from the consideration of the following detailed description taken in conjunction with the accompanying drawings in which.

DESCRIPTION OF THE EMBODIMENTS

Figure 1:
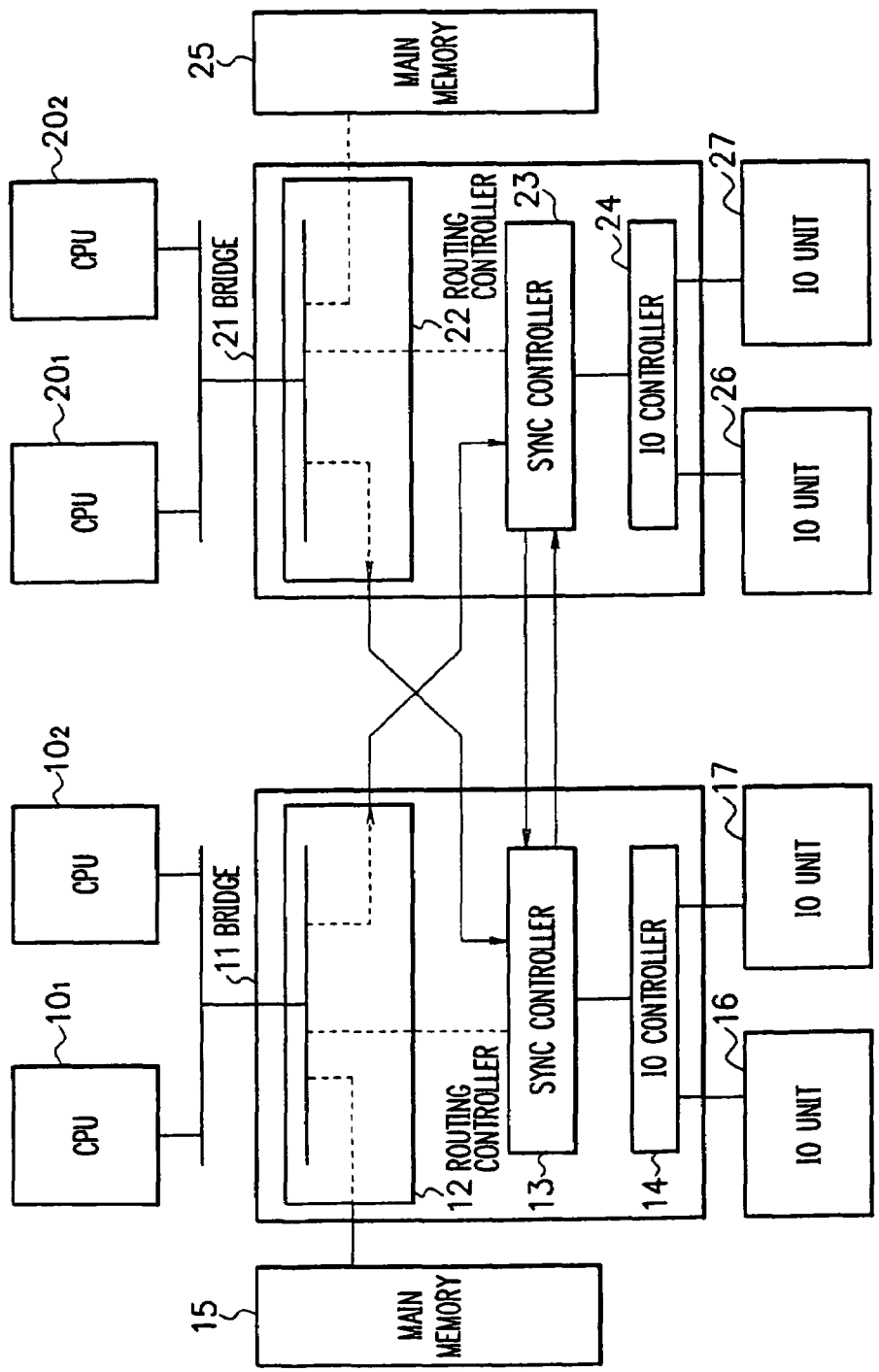
FIG. 1 is a schematic block diagram showing an overall configuration of a first embodiment in accordance with the present invention.

Referring now to the drawings, description will be given in detail of an embodiment in accordance with the present invention.

First Embodiment

FIG. 1 is a block diagram showing a general configuration of a first embodiment in accordance with the present invention. In the configuration, a line connecting constituent components to each other is a bus or wiring, and an arrow indicates a direction of propagation of a signal. This also applies to FIGS. 2 and 6. As can be seen from FIG. 1 showing a fault tolerant computer system 100, the system 100 includes a computer system 101 and a computer system 102 which are substantially equal in structure to each other. Although the embodiment includes two computer systems, the fault tolerant computer system may include three or more computer systems. The computer systems 101 and 102 respectively include central processing units (CPUs) $10_1$ and $10_2$, and CPUs $20_1$ and $20_2$. Although each computer system includes two CPUs, the computer system may also includes one CPU or more than three CPUs. The CPUs $10_1$ and $10_2$ ($20_1$, $20_2$) are connected via a bridge circuit 11 (21) to a routing controller 12 (22). The bridge circuit 11 (21) includes a routing controller 12 (22), a sync controller 13 (23), and an input-output (IO) controller 14 (24). The routing controller 12 (22) is linked with a main memory 15 (25). The IO controller 14 (24) is coupled with IO units 16 and 17 (26, 27).

When the computer system 100 is in an ordinary operation, the computer systems 101 and 102 are synchronized with each other to conduct substantially the same operation. That is, the computer systems 101 and 102 operate, according to the same clock signal. The CPUs $10_1$ and $10_2$ and the CPUs $20_1$ and $20_2$ simultaneously issue the same instructions, respectively. The instructions are delivered respectively to the bridge circuits 11 and 21. The CPUs access to the main memories 15 and 25 respectively, via the bridge circuits 11 and 21. Also, this leads to control operations for the IO units 16 and 17 and the IO units 26 and 27.

Part of the instructions issued from the CPUs $10_1$ and $10_2$ of the computer system 101 are fed via the routing control module 12 to the sync controller 23 of the computer system 102. The same instructions are also issued from the CPUs $20_1$ and $20_2$, which are transmitted via the routing controller 22 to the sync controller 13. The sync controller 23 acknowledges difference in timing between the instructions issued from the CPUs. Similarly, the sync controller 13 acknowledges difference in timing between the instructions issued from the CPUs.

Figure 2:
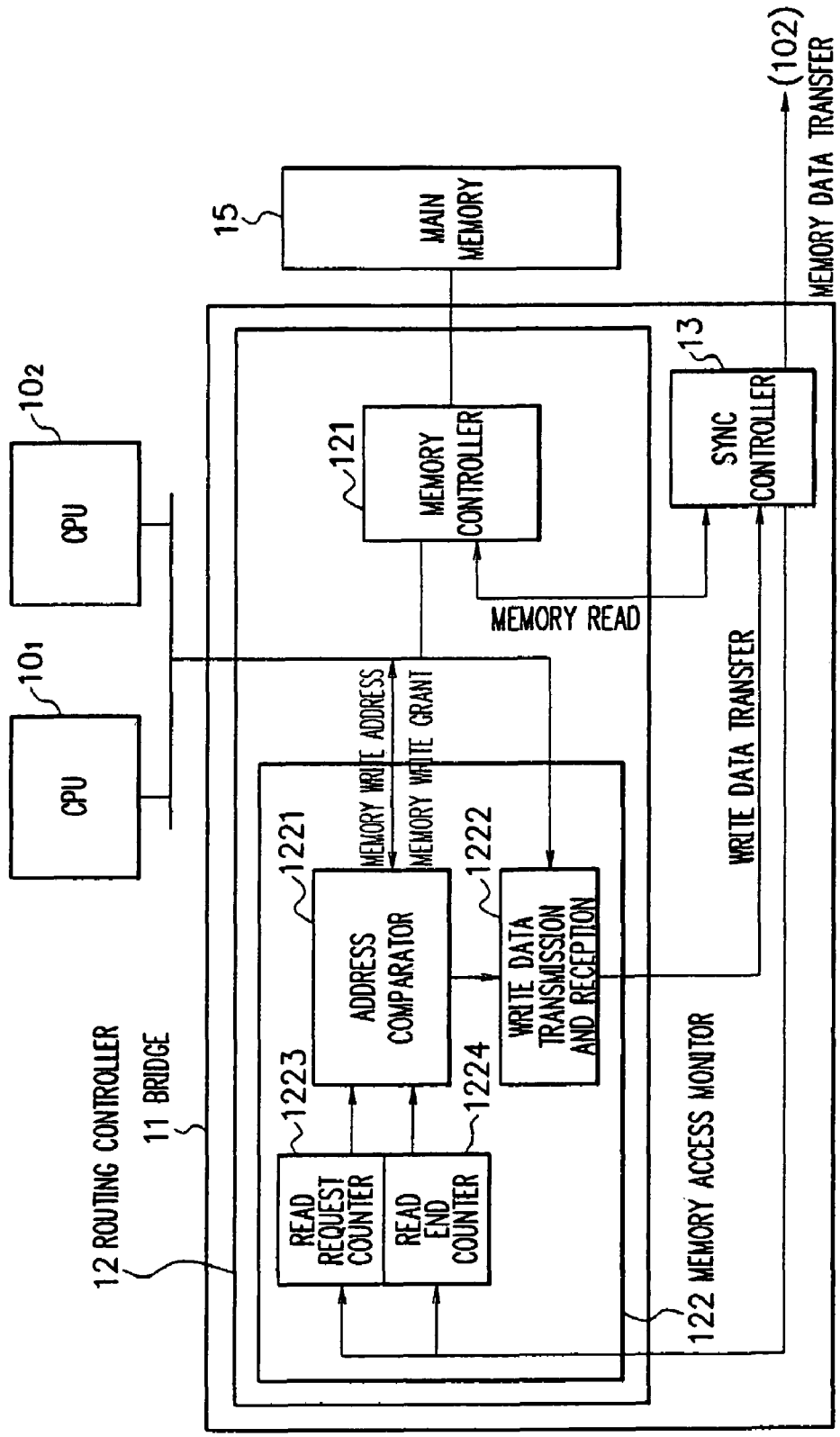
FIG. 2 is a block diagram showing a configuration of a bridge circuit in the first embodiment in accordance with the present invention.

FIG. 2 shows the configuration of the bridge circuit 11 of FIG. 1 in more detail. However, the IO controllers are not shown in the configuration diagram. As shown in FIG. 2, the routine controller 12 includes a memory controller 121 to control access to the main memory 15, and a memory access monitor module 122. Although the routing controller 12 includes other controllers such as a bus controller, such constituent components are not shown. When a memory write instruction is issued from the CPUs during a process in which data is transferred from the main memory 15 via the memory controller 121 and the sync controller 13 to the computer system 102, the memory access monitor module 122 controls transfer of write data of the memory write instruction to the sync controller 13.

The memory access monitor module 122 includes a read request counter 1223 of which a count value is increased each time the sync controller 13 issues a read request to the memory controller 121, a read end counter 1224 of which a count value is incremented each time the read operation is completed, a address comparator 1221 to compare the count value of the request counter 1223 with that of the end counter 1224, and a write data transmission and reception unit 1222 to transfer write data to the sync controller 13. Although data can be transferred in an ascending order or in a descending order, data is transferred in an ascending order in the present specification for convenience of description.

Figure 3:
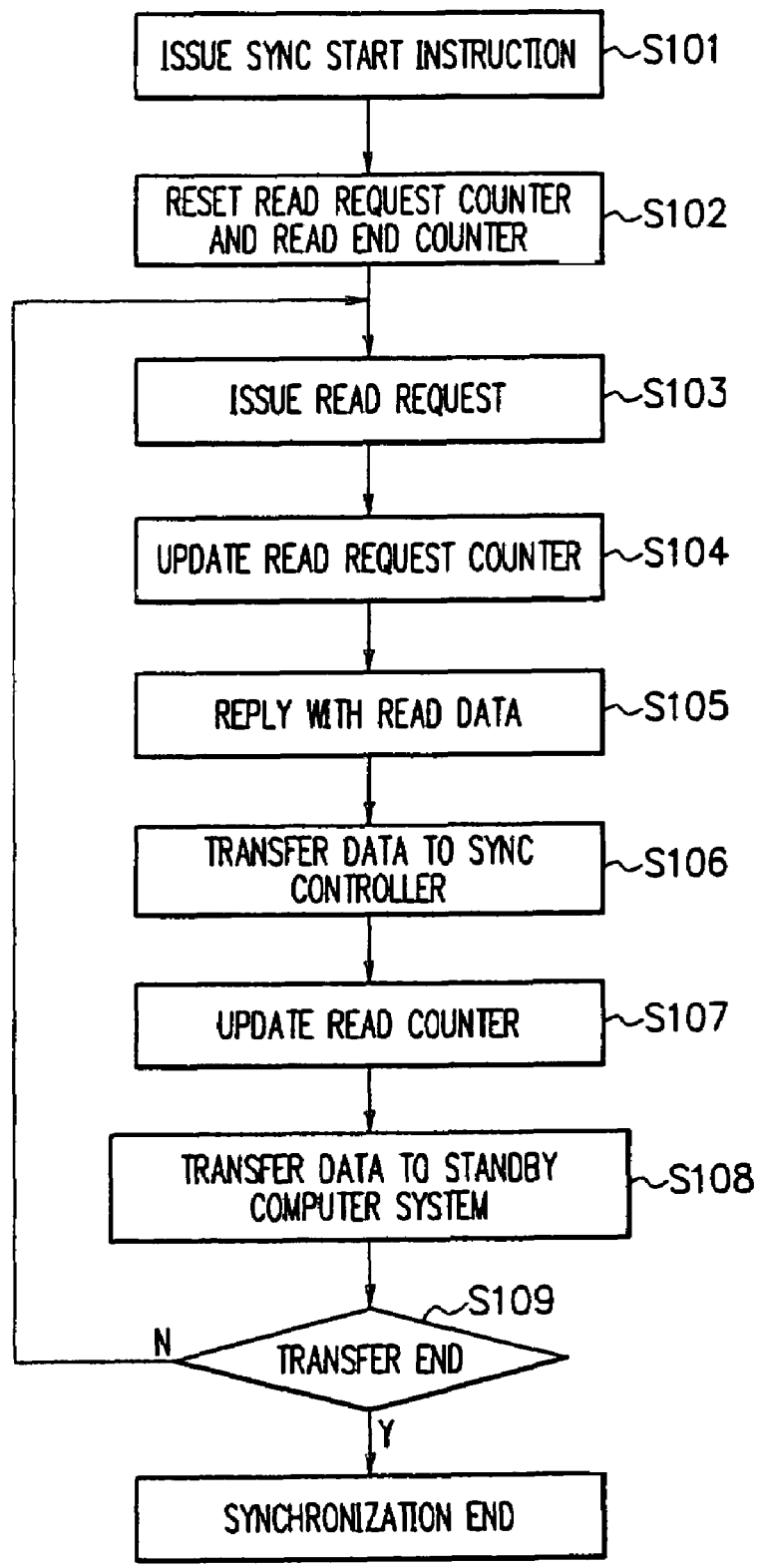
FIG. 3 is a flowchart showing a procedure of a memory copy operation in the first embodiment.
Figure 4:
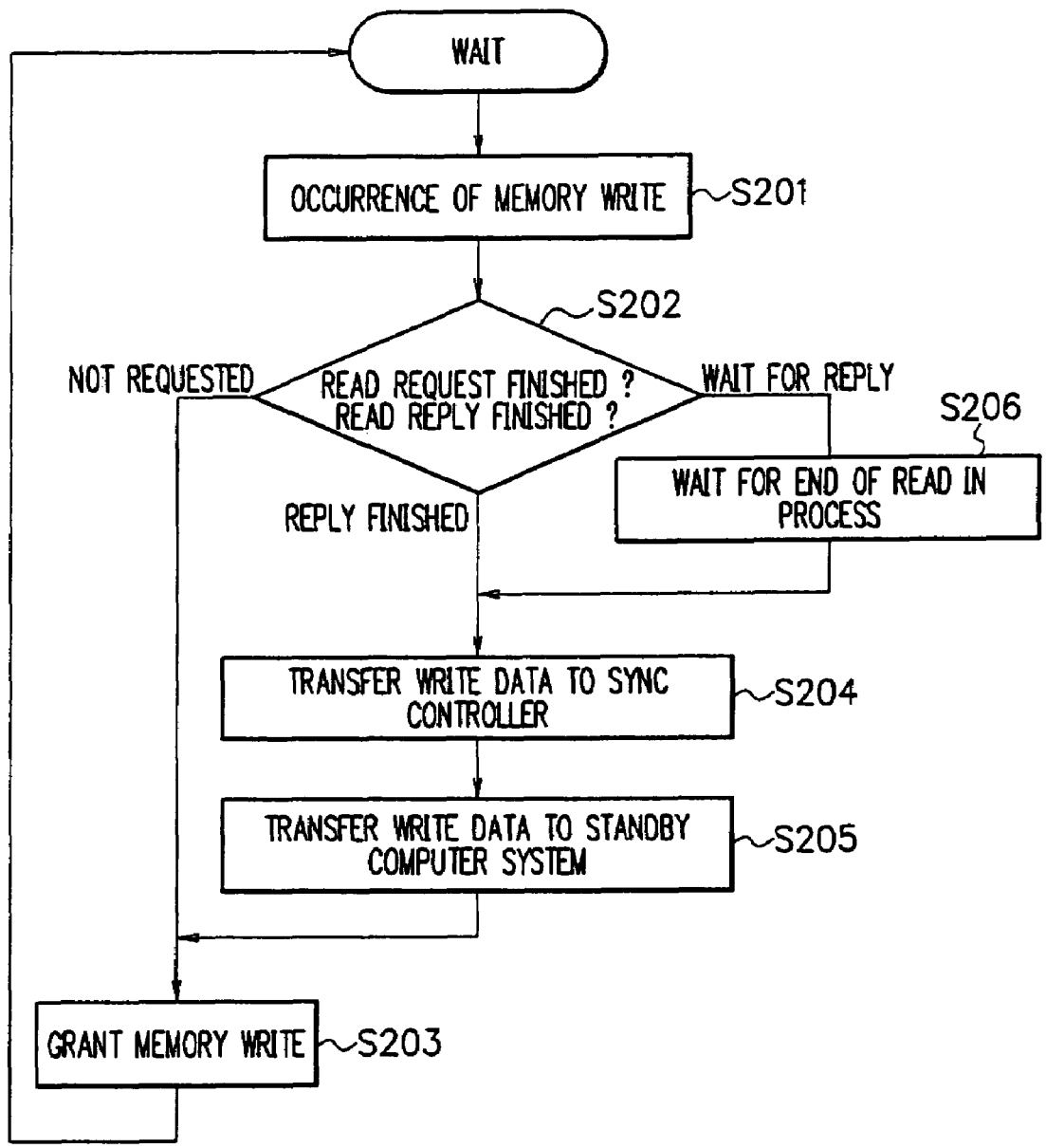
FIG. 4 is a flowchart showing a procedure of processing when a memory write instruction is issued during a memory copy process in the first embodiment.
Figure 5:
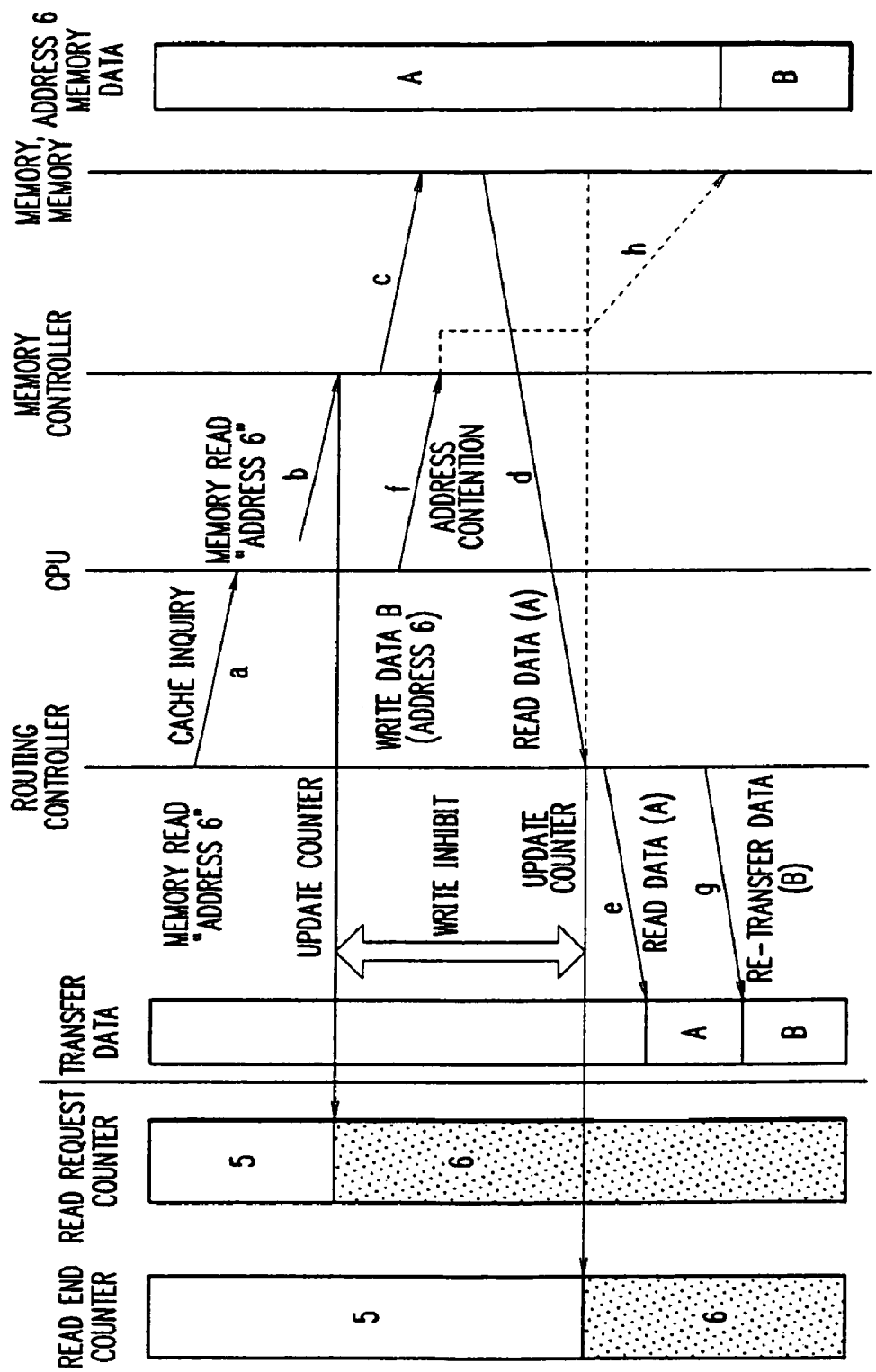
FIG. 5 is a flowchart showing a flow of instructions and data in the first embodiment.

The flowchart of FIG. 3 shows a flow of a procedure to transfer data of the main memory 15 to the computer system 102 to restore the computer system 102 in the fault tolerant computer system 100. The flowchart shown in FIG. 4 is a procedure of processing when a memory write instruction is issued during the memory copy process. The flowchart of FIG. 5 shows a flow of instructions and data in the operation to transfer data from the main memory 15 to the computer system 102. In the figure, the read request and end counters 1223 and 1224 have a counter value of "five". This indicates that data of address 6 is being transferred. Referring next to FIGS. 3 to 5, description will be given of the procedure of synchronization of computer systems in a second embodiment of the fault tolerant computer system 100. Here the computer system 101 is assumed to be an active side and the computer system 102 a standby side, the roles of the computer systems 101 and 102 may be exchanged.

In the flowchart of FIG. 3, when the CPU of the computer 101 issues a synchronization start instruction to the sync controller 13 at step 101, the counters 1223 and 1224 are reset at step S102. The sync controller 13 then issues a memory request to thereafter receive a read reply with data. The data is transferred to the computer 102 to increase the count values of the counters 1223 and 1224. At this point the counter values are five and the memory data transfer has been completed up to address 5. When the sync controller 13 issues a read request for address 6 to the routing controller 12 at step S103, the routing controller 12 inquires of the CPU whether or not the CPU has data of address 6 in a cache thereof (a in FIG. 5). Regardless of a response from the CPU, the routing controller 12 issues a read request to the memory controller 121 (b in FIG. 5). The read request counter 1223 is updated at step S104 and the main memory read operation is initiated (c in FIG. 5). When a read reply is sent out at step S105 (d in FIG. 5), the read data (data A) is transferred to the sync controller 13 at step S106. The read end counter 1224 is then updated at step S107, and thereafter the read data is delivered to the sync controller 23 of the computer system 102 at step S108 (e in FIG. 5). A check is made at step S109 to determine whether or not the data of the entire area of the main memory 15 has been completely transferred. If there still remains data to be transferred, control returns to step S103 to repeatedly execute the above processing. If it is determined at step S109 that the overall data has been transferred, it is assumed that the synchronization has been finished and hence the memory copy is terminated. The fault tolerant computer system 100 starts its ordinary operation using the computer systems 101 and 102.

Incidentally, the steps S106 and S107 of the flowchart shown in FIG. 3 may be exchanged or may be simultaneously executed.

In the processing flow of FIG. 5, if the CPU issues the memory write instruction before the read request counter is updated and after the read end counter is updated, that is, when the counters have the same count value, the memory write instruction from the CPU takes precedence in execution over the memory read instruction from the sync controller 13. Consequently, it is not required to consider the problem that the data at an address where a memory read operation has been conducted is changed by a memory write instruction. In contrast therewith, during a period of time after the read request counter is updated and before the read end counter is updated, if a memory write instruction is issued for the address of the read request, there possibly occurs a case that the data of the address for which a read reply has been made is changed by a writing operation. In accordance with the present invention, the memory write instruction is temporarily stopped for an address for which a read request has been issued during the period of time.

As can be seen from FIG. 4, during a wait state, i.e., in a state in which a memory write instruction is expected during a process of a memory copy operation, if the CPU issues a memory write instruction to the memory controller 121 at step S201, a write address thereof is passed to the address comparator 1221. A check is made at step S202 to determine whether or not the write address is the address of the read request from the sync controller 13. The address comparator 1221 compares the write address with the counter value of the read request counter 1223 and that of the read end counter 1224. If the write address is more than the counter value of the request counter 1223, it is assumed that the address of the write instruction has not been used by any read request. Therefore, a memory write grant is given to the memory controller 121 at step S203 and then the process returns to the wait state. When the address comparator 1221 determines at step S202 that the write address is equal to or less than the count value of the read end counter 1224, it is assumed that the write instruction is issued for an address for which the memory copy has been finished. The write data is delivered via the write data transmission and reception module 1222 to the sync controller 13 at step S204. The sync controller 13 sends the write data to the sync controller 23 of the computer system 102 at step S205. The sync controller 13 then gives a memory write grant to the memory controller 122 at step S203 and returns to the wait state.

When the address comparator 1221 detects at step S202 that the write address is equal to the counter value of the read request counter 1223 and is more than that of the read end counter 1224, it is assumed that the write instruction is issued for an address for which a memory read operation is currently in process. Therefore, control waits at step S206 for an event in which the count value of the end counter 1224 is updated and then goes to step S204. Assume that the read request counter 1223 has a count value of five and the read end counter 1224 has a count value of six. When a write instruction (with data B) is issued as indicated by f in FIG. 5, the process waits for an event in which the read end counter 1224 is updated. Thereafter, the data is fed via the transmission and reception unit 1222 and the sync controller 13 to the sync controller 23 of the computer system 102 as indicated by g in FIG. 5 (steps S204 and S205). Accordingly, the system gives a memory write grant to the memory controller 121 at step S203 (a memory writing operation is performed as denoted by h in FIG. 5) and then returns to the wait state.

In the flowchart of FIG. 4, the order of steps S106 and S107 may be exchanged or steps S106 and S107 may be simultaneously executed.

Second Embodiment

Figure 6:
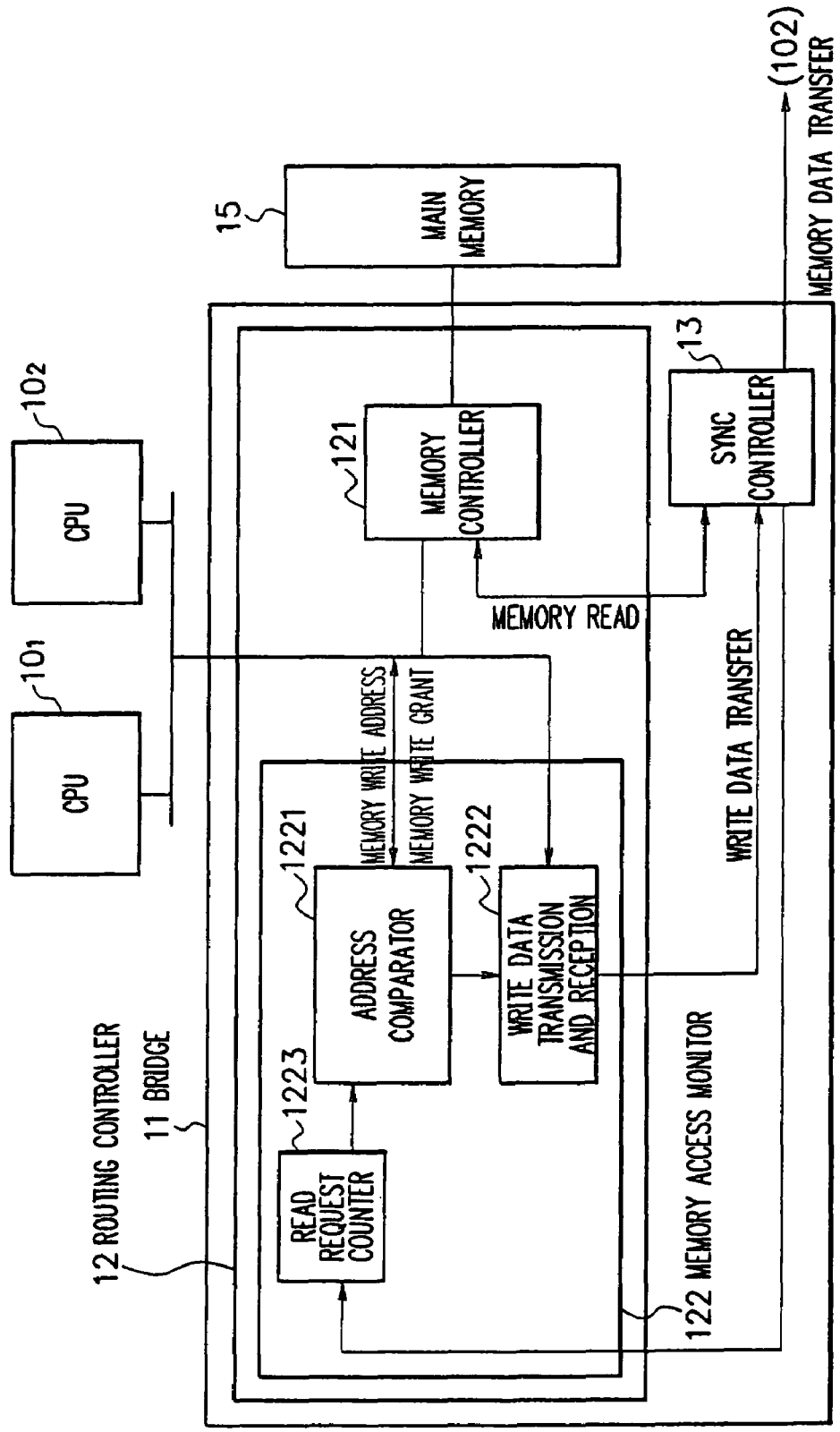
FIG. 6 is a block diagram showing a configuration of a bridge circuit in a second embodiment in accordance with the present invention.

FIG. 6 shows in a block diagram a configuration of a second embodiment of the bridge circuit 11 in accordance with the present invention. The overall configuration of the second embodiment is substantially equal to that of the first embodiment. In FIG. 6, the constituent components equivalent to those of the first embodiment of FIG. 2 are assigned with the same reference numerals, and hence duplicated description of the bridge circuit 11 will be avoided. In the second embodiment, the read end counter is not used and only the read request counter 1223 is employed.

Figure 7:
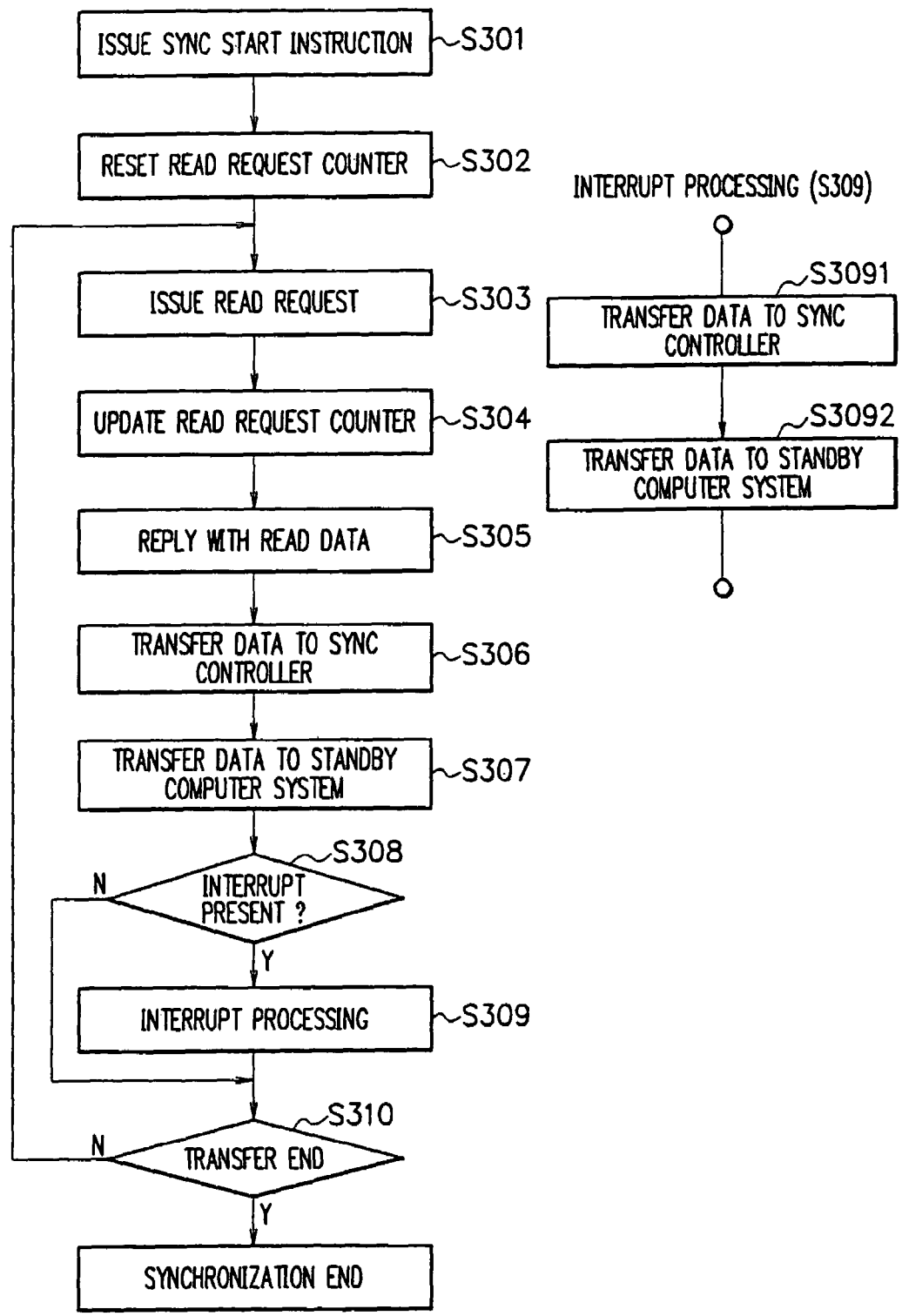
FIG. 7 is a flowchart showing a procedure of a memory copy operation in the second embodiment.

The operation flow of FIG. 7 shows a procedure to deliver data from the main memory 15 to the computer system 102 acting as the standby side in the second embodiment.

When the CPU of the computer system 101 issues at step S301 a synchronization start instruction to the sync controller 13, the read request counter 1223 is reset at step S302. The sync controller 13 then issues a read request to the memory controller 121 at step S303. The read request counter 1223 is updated at step S304 and the memory read operation is started. When a read data reply is made at step S305, the read data is fed to the sync controller 13 at step S306. The read data is then transferred at step S307 to the sync controller 23 of the computer system 102. A check is made at step S308 to determine whether or not an interrupt has been notified. If the interrupt has not been notified, a check is made at step S310 to determine whether or not the data of the entire area of the main memory 15 has been transferred. If there remains data to be transferred, control returns to step S303 to execute again the processing described above.

If it is determined at step S308 that the interrupt has been notified, control goes to step S309 to execute interrupt processing. In the processing, write data is delivered at step S3091 via the write data transmission and reception module 1222 to the sync controller 13. The write data is transferred at step 3092 to the sync controller 23 of the computer system 102 to thereby terminate the interrupt processing. If it is detected at step S310 that the data of the main memory 15 has been completely transferred, the system assumes that the synchronization is finished and terminates the copy processing.

Figure 8:
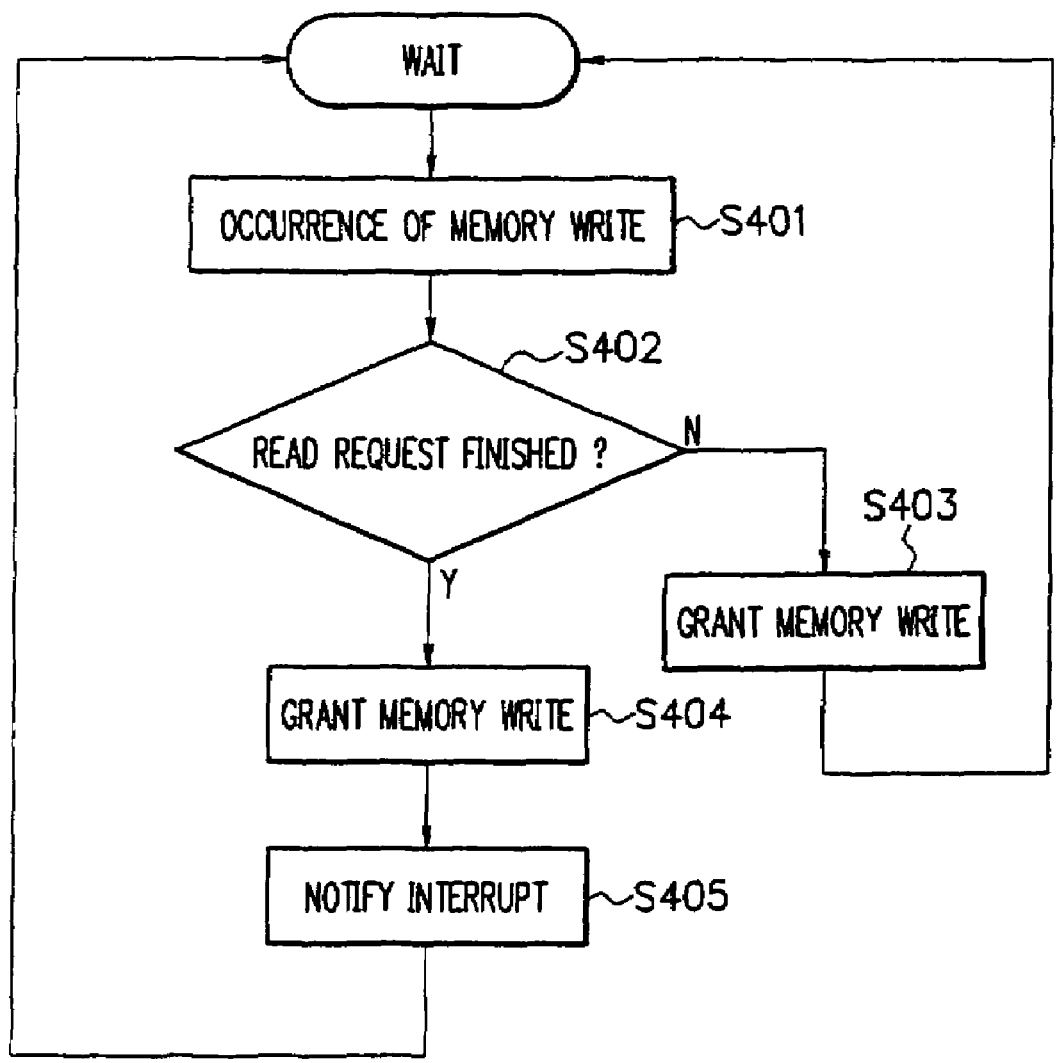
FIG. 8 is a flowchart showing a procedure of processing when a memory write instruction is issued during a memory copy process in the second embodiment.

FIG. 8 shows in a flowchart a procedure of processing in the bridge circuit 11 when a memory write instruction is issued during a memory copy process. In the wait state, when the CPU issues at step S401 a memory write instruction to the memory controller 121, a write address of the instruction is fed to the address comparator 1221. The comparator 1221 makes a check at step S402 to determine whether or not the address has already been requested by the sync controller 13 for a read request. The comparator 1221 compares the write address with the counter value of the read request counter 1223. If the write address is more than the counter value of the counter 1223, the comparator 1221 assumes that the address of the write request has not been designated by a read request and permits at step S403 a memory write to the memory controller 121 to thereafter return to the wait state. If the comparator 1221 determines at step S402 that the write address is equal to or less than the counter value of the counter 1223, the comparator 1221 assumes that the write request has been issued for an address which has already been designated by a read request. Therefore, the address comparator 1221 gives at step S403 a memory write grant to the memory controller 121 and notifies an interrupt at step S405 to return to the wait state.

In the flowchart of FIG. 8, the steps S404 and S405 may be exchanged in the execution order or may be simultaneously executed.

Although the second embodiment includes only the read request counter, it is also possible that the embodiment includes only the read end counter by removing the read request counter. In this configuration, the method described above is carried out by adding one to the counter value of the read end counter.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A fault tolerant computer system, comprising:
    a plurality of computers, each computer including:
        at least one processor;
        a main memory;
        a sync controller for reading data from the main memory of a first computer in which the sync controller is disposed and transferring the read data to the sync controller disposed in a second computer, the sync controller of an active computer of the plurality of computers sequentially transferring data from the main memory of the active computer to a standby computer of the plurality of computers when the at least one processor issues a write instruction for the main memo during an operation synchronizing the standby computer in a non-operating state with the active computer in an operating state;
    a routing controller having a memory access monitor unit and a counter module for determining a state of a process of a read operation when data is read via the sync controller from the main memory, and an address comparator for comparing a counter value of the counter module with a write address during a writing operation when a write instruction is issued by the at least one processor the memory access monitor unit transferring only write data of an address for which a data read operation has already been completed and write data of an address for which a data read operation is being currently conducted in accordance with a result of a comparison conducted by the address comparator to the sync controller of the active computer system; and
    a bridge circuit for interconnecting and controlling the at least one processor, the main memory, the sync controller and the routing controller,
    wherein the plurality of computers are synchronized and each computer processes the same instruction string.

2. A fault tolerant computer system in accordance with claim 1, wherein the counter module comprises:
    a read request counter for storing an address of data at which a data read operation is initiated; and
    a read end counter for storing an address of data at which a data read operation is completed.

3. A fault tolerant computer system in accordance with claim 2, wherein:
    in a case in which the address comparator determines that the write address is an address for which a read request is not issued, only a memory write operation is granted;
    in a case in which the address comparator determines that the write address is an address for which a data read operation is completed, a memory write operation is granted and the write data is transferred to the sync controller; and
    in any case other than those described above, a memory write operation is granted and the write data is transferred to the sync controller after a data read operation currently in process is finished.

4. A fault tolerant computer system in accordance with claim 2, wherein the write data is transferred to the sync controller at timing determined by timing at which the counter value of the read end counter changes.

5. A fault tolerant computer system, comprising:
    a plurality of computers, each computer including:
        at least one processor;
        a main memory;
        a sync controller for reading data from the main memory of a first computer in which the sync controller is disposed and transferring the read data to the sync controller disposed in a second computer, the sync controller of an active computer of the plurality of computers sequentially transferring data from the main memo of the active computer to a standby computer of the plurality of computers when the at least one processor issues a write instruction for the main memo during an operation synchronizing the standby computer in a non-operating state with the active computer in an operating state:
        a routing controller having a memory access monitor unit and a counter module for determining a state of a process of a read operation when data is read via the sync controller from the main memory. and an address comparator for comparing a counter value of the counter module with a write address during a writing operation when a write instruction is issued by the at least one processor, the memory access monitor unit executing the write instruction and notifying an interrupt, the sync controller obtaining the write data in an operation of executing interrupt processing of the interrupt thus notified when the write instruction is issued for an address for which a data read operation is completed or for which a data read operation is currently in process according to a result of a comparison conducted by the address comparator; and
        a bridge circuit for interconnecting and controlling the at least one processor, the main memory, the sync controller and the routing controller.

6. A fault tolerant computer system in accordance with claim 5, wherein the counter module comprises:
    a read request counter for storing an address of data at which a data read operation is initiated; and
    a read end counter for storing an address of data at which a data read operation is completed.

7. A fault tolerant computer system in accordance with claim 5, wherein if the address comparator determines that the write address is an address for which the sync controller has not issued a read request, only the write instruction is granted without notifying an interrupt.

8. A fault tolerant computer system in accordance with claim 5, wherein the interrupt notified by the memory access monitor unit is executed after the data read operation currently in process is finished and before a next data read operation is started.

9. A synchronization method of synchronizing a standby computer system with an active computer system for use with a fault tolerant computer system comprising a plurality of computer systems each of which comprises one processor or a plurality of processors, a main memory, a routing controller, a sync controller, and a bridge circuit connecting the processors, the main memory, the routing controller, and the sync controller to each other to control the constituent components, wherein the respective computer systems process one and the same instruction string at timing synchronized with a clock signal, wherein:

when data of a main memory of an active computer system is copied onto a main memory of a standby computer system, if a write instruction is issued for an address for which a data transfer operation is completed or for an address for which a read operation is staffed to transfer data to the standby computer system, data of the write instruction is transferred to the standby computer system to thereby synchronize the standby computer system with the active computer system without stopping the active computer system.

10. A synchronization method of synchronizing a standby computer system with an active computer system in accordance with claim 9, wherein the data of the write instruction is transferred to the standby computer system without using the main memory.

11. A synchronization method of synchronizing a standby computer system with an active computer system in accordance with claim 9, wherein when data of the main memory of an active computer system is copied onto a main memory of a standby computer system, the fault tolerant computer system reads the data via a sync controller from the main memory and transfers the data to a sync controller of the standby computer system.

12. A synchronization method of synchronizing a standby computer system with an active computer system in accordance with claim 9, wherein the routing controller further comprises a memory access monitor unit including a counter module which determines, when the data is read via the sync controller from the main memory, a state of a process of the read operation and an address comparator to compare, when the processor issues a write instruction, a counter value of the counter module with an address for which a writing operation is conducted by the write instruction.

* * * * *